United States Patent [19]

Shen et al.

[11] 4,225,572

[45] Sep. 30, 1980

[54] CATALYTIC IRON OXIDE FOR LIME REGENERATION IN CARBONACEOUS FUEL COMBUSTION

[75] Inventors: Ming-Shing Shen, Rocky Point; Ralph T. Yang, Middle Island, both of N.Y.

[73] Assignee: The United States of America as represented by the United States Department of Energy, Washington, D.C.

[21] Appl. No.: 947,664

[22] Filed: Sep. 29, 1978

Related U.S. Application Data

[63] Continuation-in-part of Ser. No. 918,618, Jun. 23, 1978.

[51] Int. Cl.$^3$ .................. C01B 13/14; C01F 5/02; C01B 17/00
[52] U.S. Cl. ................................. 423/638; 423/244; 423/635
[58] Field of Search .......... 423/242 A, 242 R, 244 A, 423/244 R, 635, 636, 638

[56] References Cited

U.S. PATENT DOCUMENTS

| 3,729,551 | 4/1973 | Gorin | 423/638 |
| 3,781,408 | 12/1973 | Lin | 423/244 A |
| 3,784,676 | 1/1974 | Moss | 423/242 A |

FOREIGN PATENT DOCUMENTS 803358  10/1958  United Kingdom .................... 423/636

OTHER PUBLICATIONS

Colussi et al., "Thermal Decomposition of Calcium Sulfate", il Cemento, vol. 71, pp. 75–98 (1974).

Primary Examiner—O. R. Vertiz
Assistant Examiner—Gregory A. Heller
Attorney, Agent, or Firm—James E. Denny; Leonard Belkin; Cornell D. Cornish

[57] ABSTRACT

Lime utilization for sulfurous oxides absorption in fluidized combustion of carbonaceous fuels is improved by impregnation of porous lime particulates with iron oxide. The impregnation is achieved by spraying an aqueous solution of mixed iron sulfate and sulfite on the limestone before transfer to the fluidized bed combustor, whereby the iron compounds react with the limestone substrate to form iron oxide at the limestone surface. It is found that iron oxide present in the spent limestone acts as a catalyst to regenerate the spent limestone in a reducing environment. With only small quantities of iron oxide the calcium can be recycled at a significantly increased rate.

8 Claims, 2 Drawing Figures

CATALYTIC IRON OXIDE FOR LIME REGENERATION IN CARBONACEOUS FUEL COMBUSTION

This invention was made under, or during, the course of, a contract with the United States Department of Energy.

This application is a continuation-in-part application of pending application Ser. No. 918,618 filed June 23, 1978.

FIELD OF THE INVENTION

This present invention relates to the combustion of carbonaceous fuels bearing sulfur. Specifically, the invention relates to the regeneration of the reaction materials used for removal of sulfurous oxides as combustion products in the combustion of solid carbonaceous fuels.

BACKGROUND OF THE INVENTION AND DISCUSSION OF THE PRIOR ART

Most carbonaceous and hydrocarbonaceous fuels contain sulfur and a major cause of air pollution is by the sulfur dioxide emanating from the fuels when burned in industrial installations.

There have been various approaches attempting to remove sulfur from the fuel, such as coal, prior to combustion. Pelcarski et al., U.S. Pat. No. 3,033,739, granted Oct. 13, 1970, sought to remove the sulfur by employing molten iron with lime as a flux; and Sass et al., U.S. Pat. No. 3,736,233, granted May 29, 1973, desulfurized the coal by employing iron oxide.

Recently fluidized bed combustion has been considered as an approach for the clean combustion of sulfur bearing coal. One aspect of the approach is flue gas desulfurization. Amongst processes which have been described for this purpose are the direct injection of dry lime/dolomite or of wet lime, or of lime slurry, into the combustion process. In the lime slurry process the solid waste causes a disposal problem and the process costs are high, whilst in the dry lime method only a fraction of the material has proved to be very reactive and once this fraction has reacted the balance reacted very slowly.

Also limiting to the widespread use of fluidized bed combustion is the economics of the use of lime as determined by the Ca/S ratio, or otherwise stated, the lime requirement. The Ca/S ratio is usually at least 2.5, and it has been considered desirous to reduce this ratio in order to provide a more economically viable process.

In one approach Moss, U.S. Pat. No. 3,807,090, granted Apr. 30, 1974, sought to burn sulfur bearing fuels in a bed of CaO and/or by MgO, and further provided iron to remove certain metals from the fuel undergoing combustion.

Lin, U.S. Pat. No. 3,781,408, discloses that $CaSO_4$ coated fine lime particulates when heated to above 2000° F., will regenerate the CaO for use in gypsum or cement, and mentions that the addition of iron oxide will increase the speed of decomposition and lower the temperature of decomposition.

Bornemann, U.S. Pat. No. 2,222,740, discloses producing sulfur dioxide from calcium sulfate in the presence of material containing iron oxide, aluminum oxide, silicon dioxide and phosphates.

While the prior art recognizes that the subsequent addition of certain metal oxides to calcium sulfate improved the generation of sulfurous oxides, the prior art sought a single catalyst for improving both the sulfurous gas absorption and desorption which could be effectively employed during combustion as well as regeneration.

The present invention provides a method for the regeneration of lime comprising heating fluidized bed particulates, which comprise calcium sulfate and iron oxide embedded therein, to a temperature of from 900° C. to 1150° C. in order to generate sulfurous oxide. The embedded iron oxide is present in about 0.5 to 10 percent by weight with the total calcium on a CaO basis. The method further comprises a first step of forming the iron oxide in lime by first forming an integrally adhering coating of an iron compound on the lime and then decomposing the iron compound. The regeneration is increased by 25 to 75 percent by the presence of the embedded iron oxide.

It is a principal object of this invention to provide a catalyst for increasing the reaction rate of lime used in the absorption of sulfurous oxides.

It is therefore an object of this invention to provide a method and composition for the absorption of sulfurous gases.

It is therefore an object of this invention to provide a method for fluidized bed combustion as aforesaid, wherein the novel composition contributing to the improved removal of sulfurous oxides is recycled so as to reuse in the fludized bed combustion.

It is another object of the invention to provide a method and composition as immediately aforesaid to permit the ready recycling of the active components to the fluidized bed combustion.

It is an aspect of this invention to provide a method and composition for the improved absorption of sulfurous oxides in the combustion of carbonaceous fuels.

It is still another aspect of this invention to provide a method for preparing limestone so as to improve its sulfurous oxide removal properties in the fluidized bed combustion of carbonaceous fuels.

It is still another object of this invention to provide a method and composition to reduce the sulfurous pollutants emanating from the combustion of carbonaceous fuels.

It is still a further objective of this invention to provide a method and composition as aforesaid which employ readily available materials and which is practical in operation.

The aforesaid as well as other objects and advantages of the present invention will become apparent from a reading of the following specification, the adjoined claims, and the drawings in which:

DISCUSSION OF THE PREFERRED EMBODIMENTS

Broadly speaking the present invention comprises a composition and process for removing sulfurous gases wherein the metal oxide coating the limestone which improves desulfurization of the limestone also acts as a catalyst to regenerate the limestone for further desulfurization. Specifically, the iron oxide present in the coal ash is used to be recycled and combined with limestone utilization in the removal of sulfurous oxides emanating from the combustion of sulfur-bearing coal.

Figure 1:
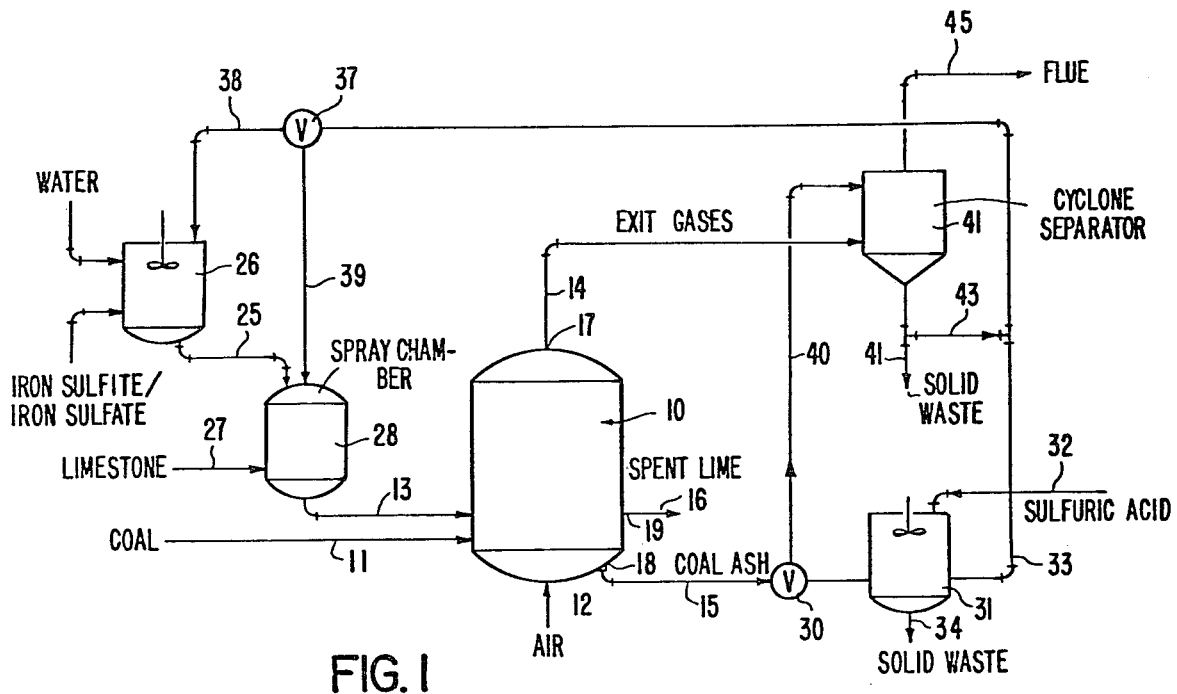
FIG. 1 is a schematic flow sheet of the present invention.

Referring to FIG. 1, there is shown a fluidized bed combustion chamber 10 of generally conventional design. In such combustion operation, coal 11 is burned in the presence of a stream of air 12 in the presence of a bed of limestone particulates 13, the composition of which will be more full discussed hereinafter. Exit gases 14 leave the combustion chamber 10 at 17, and the coal ash 15 is removed at 18 while the spent limestone 16 is removed at 19.

Figure 2:
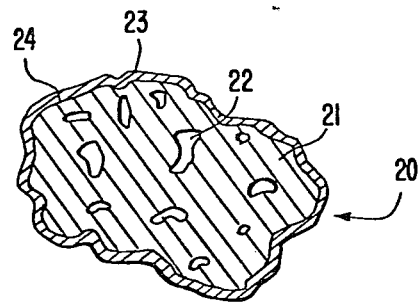
FIG. 2 is a greatly enlarged sectional view of a particle comprising the composition of the present invention.

Referring now specifically to FIG. 2., there is shown a particle of the limestone composition as formed in and used to remove sulfurous oxides in the fluidized bed combustion chamber 10, and said particle is generally designated as 20. Particle 20 comprises a base or substrate of calcined limestone 21 being formed with pores 22. A coating of iron oxide 23 integrally adheres to the outside of limestone 21 as at 24.

Referring again to FIG. 1, the particulates 20 are formed by first preparing an iron sulfite/sulfate solution 25 of high concentration of about 3 molar, in a mixing of vessel 26. A more dilute concentration may be used if desired but the high concentration is preferred. The iron sulfate/sulfite solution is then sprayed on a limestone 27 in a spray chamber 28, to form the limestone feed 13. The limestone 27 may be precalcined or will be subsequently calcined in combustion chamber 10.

Coal ash 15 contains approximately 10 to 20 percent Fe as $Fe_2O_3$. In a material balance of combustor 10, we find that with a coal having 3 percent sulfur, the coal requires a 10:2 weight ratio of coal to limestone, or 10:1.1 on a CaO basis. After combustion approximately 10 percent of the coal remains as ash. We thus have 1 pound of ash for every 10 pounds of coal. Further, 1 pound of coal ash will contain up to about 0.2 pounds of $Fe_2O_3$ or approximately 20 percent of the CaO requirement. If all the $Fe_2O_3$ is recovered there is an abudance of ash-source $Fe_2O_3$ for limestone treatment, insofar as only up to about 10 percent $Fe_2O_3$ (by weight of CaO), at the most, is required for the regeneration of the limestone.

Coal ash 15 passes through valve 30 to mixing vessel 31, wherein the ash is treated with sulfuric acid 32 to form iron sulfate/sulfite 33 which is returned to mixing vessel 26 through valve 37 and line 38 for additional make-up iron sulfate/sulfite to the extent and concentration as required for subsequent spraying in chamber 28. Alternatively the recycled iron sulfate/sulfite 33 may be directly used in spray chamber 28 as at 39. If dilute iron sulfate/sulfite solutions are sprayed on the limestone it is contemplated that multiple spraying may be advantageous. The acid treated coal ash in vessel 31 leaves a residue of principally carbon which is filtered off as solid waste 34.

The coal ash 15 may also be passed through valve 30 and line 40 to premix in the cyclone separator 41, where exit gases 14, if they contain sulfur dioxide, are first mixed with the ash containing $Fe_2O_3$ to effect a formation of iron sulfate/sulfite which is then passed by gravity downward through cyclone separator 41 to line 43 to combine with the flow of line 33. Solid waste is removed at 44 and sulfur free gases exit at 45.

While the aforesaid described preferred embodiment refers to iron sulfate/iron sulfite it is within the broad contemplation of this invention to employ any metal salt which will decompose under high temperatures present in carbonaceous fuel combustion to provide a metal residue on the limestone. By the term "metal" as used hereinbefore and hereinafter throughout the specification and claims it is meant any metal, including mixed metals or complex metals forming complex metal salts; also particularly the transition metals, and preferrably the Group VIII metals, Co, Fe, and Ni. Most preferred is Fe in view of its low cost and abundance in the coal ash. By the term "salt" as used hereinbefore and hereinafter throughout the specification and claims, it is meant any group which will combine with the "metal" as aforesaid and undergo decomposition, including by way of example, $SO_3$, $SO_4$, $CO_3$, oxalate, acetate, formate and the like. Other groups such as nitrates are in theory useful but in practice provide noxious nitrous gases upon decomposition, and therefore of obvious questionable use.

The metal salts of this invention may be applied in the limestone by any suitable operation known to one skilled in the art. The metal salt may be dissolved in a solvent and sprayed directly onto the limestone, or the limestone may be dipped or soaked in the salt solution. Further the metal salt or the metal oxide may directly integrally adhere to the limestone surface by sintering or fluxing or other known fusing techniques. It is also within the contemplation of this invention to mix the metal oxide and the limestone for dry coating but this is not preferred coating technique.

It is also within the scope of this invention to include all reductants such as C, CO, $H_2$, $CH_4$ to produce the reducing environment for the lime regeneration. Any mode of operation known to one skilled in the art, such as kiln, fluidized-bed, fixed-bed may also be applied in effecting this regeneration.

The most preferred metal is iron and most preferred salt is iron sulfate and/or iron sulfite, which readily decomposes to iron oxide. It has been found that 0.25 to about 10.0 weight percent of iron oxide of the limestone (based on CaO) is useful pursuant to the present invention and the preferred range is 0.5 to 3.0 weight percent. It is, of course, understood where other metal oxides are used the weight percentages would be commensurately different in proportion to the molecular weights compared to that of iron oxide. It is also found that the iron sulfate/iron sulfite is present in an amount approximating 0.50 to 10.0 weight percent of the limestone (based on CaO).

EXPERIMENTAL EXAMPLE I

Greer limestone having the following chemcial analysis was used in this example:

|  | Percent by weight |
|---|---|
| $CaCO_3$ | 80.4 |
| $MgCO_3$ | 3.5 |
| $SiO_2$ | 10.3 |
| $Al_2O_3$ | 3.2 |
| $Fe_2O_3$ | 1.2 |
| $Na_2O$ | 0.23 |
| $H_2O$ | 1.17 |

Particle range: −16+20 Tyler screen mesh.

The Greer Limestone is the calcined form and has a pore structure following a uni-modal size distribution with the majority of the pores having a diameter in the range of 0.2 to 0.4 microns. All other solid materials used in this example were supplied by Matheson Company as custom-made, premixed $SO_2$ in $N_2$, at the various specified concentrations.

The lime samples were dipped (soaked) in concentrated $Fe_2(SO_4)_3$ aqueous solution of about 3 molar concentration at room temperature for 2-5 minutes. Both uncalcined limestone or precalcined limestone (i.e. calcined at 900° C. in $N_2$) were treated with $Fe_2(SO_4)_3$ in the aforesaid manner.

The treated samples were air-dried, and then rapidly heated at 25° C./minute in $N_2$ to $N_2$ 900° C. Distinct stages in weight loss were noted as follows: moisture loss below 200° C.; thermal decomposition of ferris sulfate below 600° C.; and calcination of the carbonate alone 700° C.

The amount of $Fe_2O_3$ deposited on the lime surface was calculated from the weight loss due to the reaction.

$Fe_2(SO_4) \rightarrow Fe_2O_3 + 3SO_3$. The iron content was also checked with the results of atomic absorption analyses and the above method was confirmed as accurate, as reported in Table I.

$SO_2$, reactivity measurements were commenced when the temperature reached 900° C. and when the calcination was complete for the experiments involving the uncalcined stone. For reactivity measurements, the reacting gas had the following composition: 0.25 percent $SO_2$, 5 percent $O_2$, 5 percent $H_2O$ and balance $N_2$. Reactivity measurements were conducted using a DuPont thermoanalyzer Model 951, and a small quartz boat with an area of about 0.6 cm² was used as the sample holder (a platinum boat was not used to avoid possible catalytic effects). A quartz tube packed with alumina chips and housed in a tubular furnace served as the pre-heater for the reactant gases. Steam in the reactant gases was generated by bubbling the inert carrier gas ($N_2$) through a temperature-controlled water bath prior to entering the pre-heater. The bubbler was jacketed and water was circulated in the jacket from a constant temperature water bath.

In a typical experiment, about 40 mg of lime sample was spread into a thin layer on the holder as the solid reactant. The pre-heated gas mixture lowed over the sample surface at a velocity of about 10 cm/sec. The velocity was pre-determined to be high enough to minimize the role played by the gas film diffusion, or the overall rate did not increase with further increase in the velocity.

The fluidized-bed sulfator, which was also used to measure the sulfation rate, was a 3-cm diameter quartz unit. Details of the reactor have been given elsewhere. The pre-treated samples, which had been subjected to the aforementioned treatment, were dropped into the pre-heated reactor with pre-heated sulfating gas mixture flowing through it. The $SO_3$ content in the sample was measured after certain periods of reaction time, as shown in Table 1. The Dupont analyzer was used.

TABLE 1

Catalytic effect of the reactivity of lime for sulfation

| Time, min. | Percent CaO sulfated* in sample** | | | | |
|---|---|---|---|---|---|
| | A | B | C | D | E |
| 10 | 10.1 | 14.3 | 11.8 | 10.3 | 10.2 |
| 30 | 23.7 | 37.4 | 31.9 | 26.6 | 28.0 |
| 60 | 32.7 | 60.2 | 49.7 | 39.0 | 43.6 |
| 90 | 36.9 | 72.3 | 56.8 | 43.4 | 49.5 |
| 120 | 37.7 | 77.7 | 60.03 | 45.5 | 52.3 |
| 150 | 38.4 | 80.7 | 62.7 | 46.8 | 53.8 |

TABLE 1-continued

Catalytic effect of the reactivity of lime for sulfation

| Time, min. | Percent CaO sulfated* in sample** | | | | |
|---|---|---|---|---|---|
| | A | B | C | D | E |
| 180 | 39.9 | 82.5 | 64.4 | 47.9 | 54.9 |

*Sulfation conditions: 900° C. and 1 atm. with 0.25% $SO_2$, 5% $O_2$, 5% $H_2$) and balance $N_2$. Sample size = 16 + 20 Tyler mesh.
**A: Greer limestone pre-calcined at 900° C. in $N_2$. (Note: the limestone contains .8% $Fe_2O_3$ inherently distributed throughout the particles).
B: Pre-calcined lime coated or deposited with 1.35% $Fe_2O_3$ (based on CaO)
C: Uncalcined limestone coated with 1.42% $Fe_2O_3$ (based on CaO)
D: Pre-calcined lime physically mixed with 1% $Fe_2O_3$ particles (size 200 + 325 mesh).
E: Pre-calcined lime mixed with 1.37% NaCl.

It is thus observed that the iron oxide not only catalyzed the sulfation rate but also increased the capacity for $SO_2$ absorption. This is evidenced by the fact that the results of Samples B and C did not plateau as readily as sample A.

EXPERMIMENTAL EXAMPLE II

A fluidized-bed sulfator was employed in this example. A treated sample prepared as in Example I was employed, said example contained about 0.7 to 0.8 weight percent $Fe_2O_3$ (based on CaO) deposited on the uncalcined limestone. The total sulfur absorption was increased by 30 weight percent in three hours of fluidized-bed sulfator operation as compared with a sample which was not dipped in the ferric sulfate solution.

EXPERIMENTAL EXAMPLE III

A similar sample of Greer limestone was vacuum impregnated with concentrated aqueous ferric sulfate to provide similar weight percentages of $Fe_2O_3$ but fully impregnated throughout the pore structures. No added effectiveness in $SO_2$ absorption was observed as compared with the $Fe_2O_3$ surface counted samples of Example 1.

EXPERIMENTAL EXAMPLE IV

Five samples of precalcined limestone were prepared as follows:

| Sample No. | Coating |
|---|---|
| 1 | uncoated |
| 2 | cobalt sulfate (heptahydrate) |
| 3 | nickel sulfate (heptahydrate) |
| 4 | ferric sulfate |
| 5 | ferrous sulfate (heptahydrate) |

The coating weight of coatings per unit weight CaO was approximately the same for each coating. The coated samples were predecomposed before thermogravimetric analysis (TGA). The results of sulfur dioxide absorption indicate that sample No. 4 showed approximately twice the level of absorption compared to sample No. 1, while sample Nos. 2, 3 and 5 showed measurable improvement over the incoated sample No. 1.

The Example demonstrates the usefulness of all Group VIII metal oxides pursuant to the present invention.

EXPERIMENTAL EXAMPLE V

A sulfated Greer limestone, as in Sample C of Table 1, was regenerated at 1000° C. in the thermogravimetric analyzer in the presence of carbon. The sulfated limestone and carbon were present in a stoichiometric ratio of $CaSO_4:\frac{1}{2}°$ C. An incremental increase of approximately 25–75% in the regeneration rate was obtained. The rate calculations were based on the total fractional regeneration of the sulfated sample after $\frac{1}{2}$ hour of reaction time, which approximates the conditions for large-scale process operation.

A sulfated Greer limestone as in Sample C of Table 1, was also regenerated at 1000° C. in the thermogravimetric analyzer in the presence of CO, $H_2$ and $CH_4$.

This example demonstrates the regenerative catalytic activity of iron oxide in the presence of reductants.

This present invention further recognizes that the presence of certain metal oxides will increase the regeneration rate of spent limestone 16 when the spent limestone is subjected to a reduction environment at elevated temperatures. By "regeneration" it is meant converting the calcium sulfate at the surface of the limestone particles to active lime. Such regenerated lime, still containing the calalytic metal oxide can generally be recycled directly to the fluidized bed combustor 10 without further treatment.

By the term "metal oxide" it is meant any metal oxide, but principally the Group VIII metal oxides, and most preferably iron oxide. It has been found that iron oxide in amounts of from about 0.5 to 10 percent by weight of the limestone (CaO basis) increases the regeneration rate of the spent lime, and the rate of regeneration increases with the amount of iron oxide present. Regeneration rate increases of at least 10%, and usually 30 to 70% have been found. Often only 1 to 2% $Fe_2O_3$ is required to show significant rate improvements.

Suitable reductants in the regeneration include the well-recognized materials such as C, CO, $H_2$, $CH_4$ and the like, which are introduced in conventional high temperature apparatus, such as kilns, and both fluidized-bed and fixed-bed chambers. The temperature at which regeneration occurs has been found to be from 950° C. to about 1150° C., although the temperature may be adjusted as determined by the skilled practitioner in the art.

Heat is generated by the fluidized-bed combustion of the present invention and may be used for steam and power generation. Some of the heat of course may be utilized to produce the in situ reaction of the iron sulfite/sulfate to iron oxide on the limestone surface.

While a fluidized bed combustion system is described herein for purposes of disclosures, it will be apparent to those skilled in the art that the heat generated from the combustion of fuel by the present invention may be utilized in any application where hot products of combustion are utilized as reagents or as a heat and energy source, and where carbonaceous fuel is available. The present invention therefore is well adapted to carry out the objects and attain the ends and advantages mentioned as well as those inherent therein. While presently preferred embodiments of the invention are given for the purpose of disclosure numerous changes in the details of the process arrangement of steps can be made which will readily suggest themselves to those skilled in the art and which are encompassed within the spirit of the invention and the scope of the appended claims.

What we claim is:

1. A method for the regeneration of lime comprising heating fluidized bed particulates comprising calcium sulfate and iron oxide embedded therein from 900° C. to 1150° C. to generate sulfurous oxide therefrom, and wherein the embedded iron oxide is present in an amount of about 0.5 to 10 percent by weight of the total calcium on a CaO basis, and wherein the regeneration is increased by 25 to 75 percent by the presence of the embedded iron oxide, and method further comprising a first step of forming the iron oxide in said lime by first forming an integrally adhering coating of an iron compound on said lime, then decomposing said iron compound.

2. The method of claim 1 wherein said decomposition is achieved by mixing said coated lime with burning, sulfur containing, coal in a fluidized bed combustor, whereby said calcium sulfate is formed essentially simultaneously with said decomposition.

3. The method of claims 1 or 2 wherein said regeneration is in a reducing environment.

4. The method of claim 1 or 2 wherein said iron compound is an aqueous solution comprising iron sulfate and iron sulfite.

5. The method of claim 4 wherein said environment is created by the presence of a reducing agent selected from C, CO and $H_2$.

6. The method of claim 4 wherein said iron sulfate and iron sulfite comprise iron recovered from coal ash.

7. The method of claim 6 wherein said reduction is in a reducing environment.

8. The method of claim 7 wherein said reducing environment is created by the presence of a reducing agent selected from C, CO and $H_2$.

* * * * *